July 20, 1965   L. G. SYMONS ETAL   3,195,801
BLOCK BOTTOM BAG

Filed April 16, 1962   7 Sheets-Sheet 1

INVENTORS
Lloyd G. Symons
James S. Glass
Lindley C. Greenhalgh, deceased
by Margaret C. Greenhalgh,
    Administratrix BY Smart & Biggar
ATTORNEYS.

INVENTORS
Lloyd G. Symons
James S. Class
Lindley C. Greenhalgh, deceased
by Margaret C. Greenhalgh,
Administratrix
BY Smart & Biggar
ATTORNEYS.

United States Patent Office 3,195,801
Patented July 20, 1965

3,195,801
BLOCK BOTTOM BAG
Lloyd George Symons, St. Lambert, Quebec, James Stuart Glass, Pointe-Claire, Quebec, Canada, and Lindley Craig Greenhalgh, deceased, late of Baie d'Urfe, Quebec, Canada, by Margaret Clare Greenhalgh, executrix, Kent, England, assignors to St. Regis-Consolidated Packaging Limited
Filed Apr. 16, 1962, Ser. No. 189,227
Claims priority, application Canada, June 8, 1961, 825,249
7 Claims. (Cl. 229—62.5)

This invention relates to a novel bag formed from heat-sealable thermoplastic material, which bag is foldable into a flat condition when empty and has a parallelepipedal shape when filled, and to a method of making this bag.

Thermoplastic bags are already known which are formed from a tube of thermoplastic material which is cut transversely to the axis of the tube and then joined together along the lines of cutting. The main disadvantage of these known bags is that when filled they assume the shape of a pillow or cushion, a shape which is disadvantageous when it is desired to stack the bags, as well as being wasteful of material due to the fact that the "pillow corners" will hold only a small volume of material.

"Block-bottom" or parallelepipedal bags have, we are aware, been constructed in the past using one or more plies of paper or like material and using an adhesive to secure the bottom-forming members in place, which bottom forming members are usually formed by suitable cuts and folds in the opposite ends of the blank or tube from which the said bags were constructed, but our present invention is distinguished from these prior art arrangements by virtue of the fact that a "block-bottom" or parallelepipedal bag is wholly constructed of heat-sealable thermoplastic material with the bottom being formed and joined to the side walls of the bag by a series of heat-sealing steps. The bags of the invention may be formed of one or more plies of thermoplastic material or may be formed from a thermoplastic film which is laminated to or reinforced with a substrate such as paper, fabric or another thermoplastic film.

The bags according to the invention are each preferably provided with a single valve located in one of the corners of the bags, the valve serving to facilitate the filling of the bag with granular or pulverulent materials and the retention of such materials within the bag once it has been filled.

The bag of the invention may be generally defined as a bag formed from a heat-sealable thermoplastic material, the bag being foldable into a flat condition when it is empty and having a parallelepipedal shape when filled, the bag when filled having four sidewalls and at least one bottom having rectangular edges, at least two of the four edges of each rectangular bottom being heat-sealed along its length to two of the sidewalls.

In one of the embodiments of the invention each bottom is integral with one of the sidewalls and is joined to the opposite sidewall by a line of heat-sealing and to at least one of the adjacent sidewalls by a second line of heat-sealing.

According to another embodiment of the invention the rectangular bottom is not formed integrally with any of the sidewalls of the bag but is a separate rectangular element which is joined to at least three of the sidewalls by lines of heat-sealing running along three of the rectangular edges of the rectangular bottom.

In the case of each of these embodiments of the invention a filling valve is preferably mounted in the bag at a point where one of the sidewalls meets the bottom and is not joined to the bottom by a line of heat-sealing.

The method of the invention may be generally defined as a method of making a bag comprising taking a flattened tube of thermoplastic heat-sealable material having parallel edges; separating and folding at least one end of the tube to produce an open rectangle extending at right angles to the axis of the flattened tube; closing said open rectangle by superimposing upon it a rectangular flap which is of substantially the same shape as the rectangle but is slightly larger than said rectangle; and joining said rectangular flap to said tube by least two lines of heat-sealing, said lines extending along two of the edges of the flap and two of the edges of the rectangle.

In drawings which illustrate embodiments of the invention:

FIGURES 1–7 show various stages in the formation of a bag according to one embodiment of the invention:

FIGURES 8 to 10 inclusive, illustrate a second embodiment of the invention;

FIGURES 11 to 14 inclusive show a third embodiment of the invention;

FIGURES 15, 16 and 17 show a fourth embodiment of the invention, the fourth embodiment being characterized by a gusset fold in two of the opposite sidewalls of the bag;

Turning now to a detailed consideration of the drawings, and referring first to the embodiment of the invention shown in FIGURES 1 to 7 inclusive, reference numeral 10 indicates a flattened tube formed from heat-sealable thermoplastic material, having parallel edges 11 and 12 and parallel ends 13 and 14, the said ends being cut at right angles to the axis 15 of the tube. The tube 10 may be initially produced as a tube or simply as a continuous web which is then folded upon itself and connected along its meeting edges so as to form a tube. The side 10a of the tube 10 is provided with a pair of fold lines 16 which are parallel to one another and extend transversely across the side 10a of the tube at points equidistantly spaced from the opposite ends of the tube. A second set of fold lines is provided in each side of the tube, the second set extending in an angle of about 45° to the axis of the tube from the two points of intersection of each of the first fold lines 16 with the sides 11 and 12 of the tube 10.

Figures 1, 2, 3:
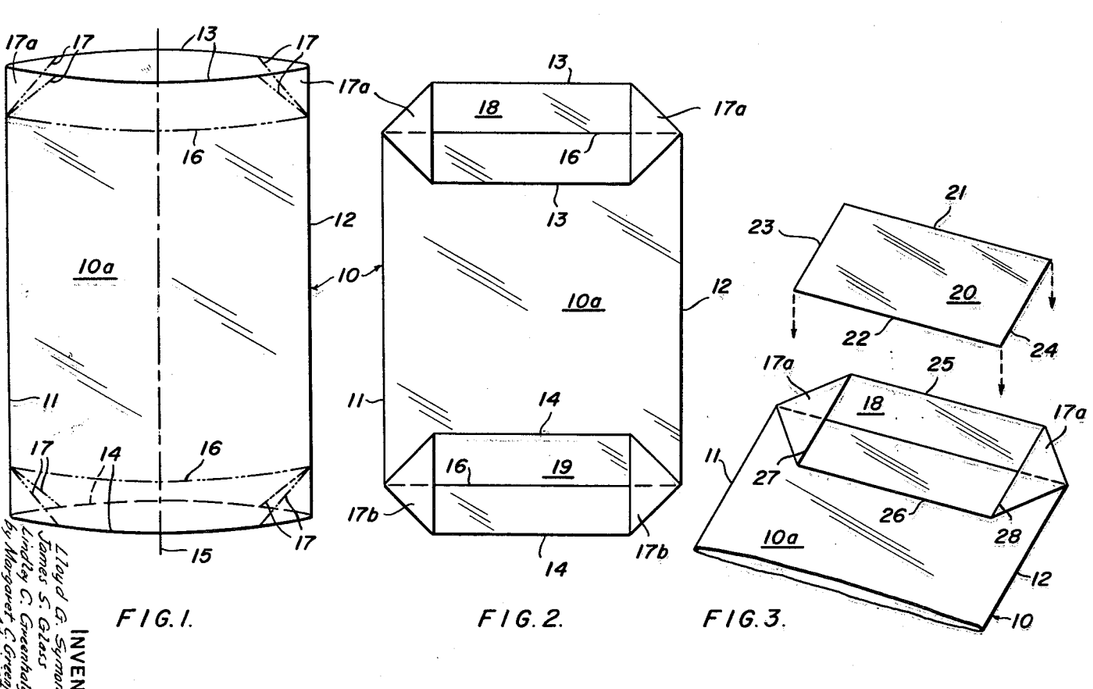
FIGURE 1 is a view of the blank from which the bag of this embodiment is formed.
FIGURE 2 shows the two ends of the blank separated and folded so as to form an open rectangle at each end of the tube.
FIGURE 3 shows the step of superimposing a separate rectangular bottom upon the open rectangle formed in FIGURE 2.

Once the tube 10 has been folded as indicated in FIGURE 1 to provide the first set of fold lines 16 and second set of fold lines 17, the two ends 13 are pulled outwardly and the triangles 17a of material bounded by the lines 17 and part of the upper end 13 are pressed inwardly to form an open rectangle 18 as indicated at the top of FIGURE 2. A similar open rectangle 19 is formed at the opposite end of the bag by similarly separating the ends 14 and tucking inwardly the triangles 17b formed by the fold lines 17 and the extremities of the lower end 14.

Figure 4:
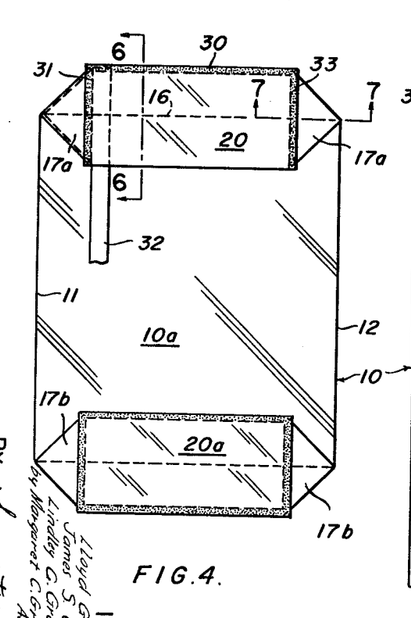
FIGURE 4 shows some of the heat-sealing steps and shows the manner in which an insulating element is employed to prevent adhesion of layers of the material which it is desired to keep separate despite the heat-sealing steps.
Figure 4A:
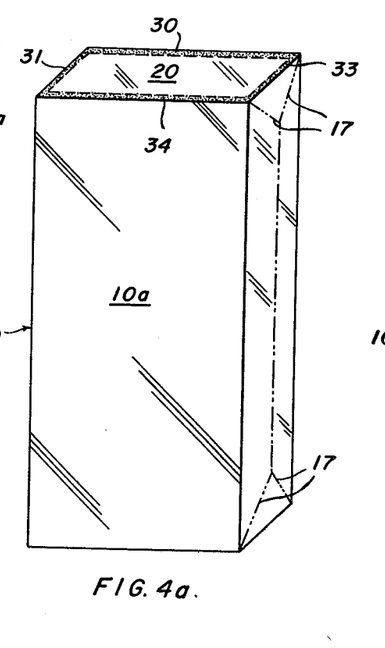
FIGURE 4a is a perspective view of the finished bag after it has been filled.
Figure 5:
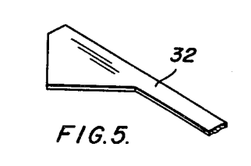
FIGURE 5 is a perspective view of the insulating member shown in FIGURE 4.
Figure 6:
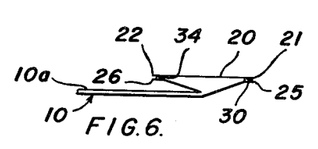
FIGURE 6 is a cross-sectional view through one end of the top of the finished bag, the view being taken along the line 6—6 in FIGURE 4.
Figure 7:
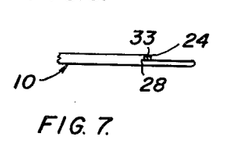
FIGURE 7 is another cross-sectional view of the top of the finished bag, the view being taken along the line 7—7 in FIGURE 4.

A rectangnular bottom 20, which is of substantially the same width as the open rectangle 18 but is slightly longer than said rectangle, is then aligned with and superimposed upon said rectangle as indicated in FIGURES 3 and 4. A similar rectangular bottom would be superimposed upon the open rectangle 19, but, since it is similarly treated to the rectangular bottom aligned with and superimposed upon the open rectangle 18, only the attachment of the latter to the tube will now be described. The rectangular bottom member 20 has longitudinal edges 21 and 22 and transverse edges 23 and 24. The corresponding edges of the open rectangle 18 have been labelled 25, 26, 27 and 28 respectively. Once the rectangular bottom 20 has been superimposed upon the rectangle 18 with the sides of one in alignment with the sides of the other, a first line of heat-sealing 30 (see FIGURES 4 and 6) is made with conventional heat-sealing apparatus so as to join the edges 21 and 25. The edegs 23 and 27 are then joined to one another by means of a line of heat-sealing 31, using the same heat-sealing apparatus, after first inserting below the overlapped edges a heat insulating member 32 which has been indicated in FIGURE 4 and is best seen in FIGURE 5. The purpose of inserting the insulating member 32 is to prevent the heat-sealing effect extending beyond the area where it is desired and inadvertently joining the lower side of the edge 23 to the part of the tube 10 lying therebelow. A third line of heat-sealing 33 is then established to join the deges 24 and 28 to one another as indicated in FIGURES 4 and 7, once again utilizing the insulating member 32 to prevent undesirable spreading of the heat-sealing effect. A fourth line of heat-sealing 34 is then established to join the edges 22 and 26 to one another as best seen in FIGURES 4a and 6. Those familiar with the heat-sealing and bag-making arts will appreciate that there is no need to resort to the use of an insulating member when making either the line of heat-sealing 30 or line of heat-sealing 34 since both said lines are located at the marginal edges of two elements which are being joined to one another.

In similar fashion a second rectangular bottom 20a would be aligned with, superimposed upon, and joined to the edges of open rectangle 19. In the case where one of the corners of the bag is to be provided with a valve, one of lines of heat-sealing 31 or 33 would be omitted at either the top or bottom of the bag, and a valve member would be inserted at this point in a manner which will be explained in detail later on in this specification in connection with FIGURES 18 to 31 inclusive.

Figure 8:
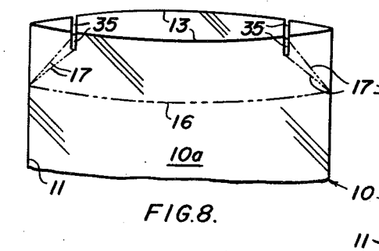
FIGURE 8 is a view of one end of the tubular blank from which this embodiment of the invention is formed.
Figures 9, 11:
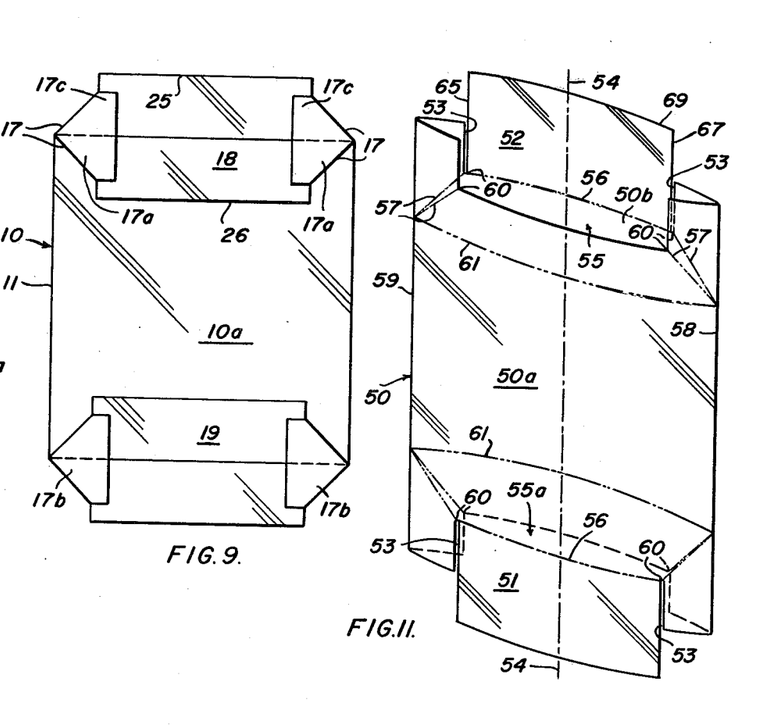
FIGURE 9 shows the blank of FIGURE 8 which has been separated and folded so as to form an open rectangle.
FIGURE 11 shows the blank from which this embodiment of the invention is formed.
Figure 10:
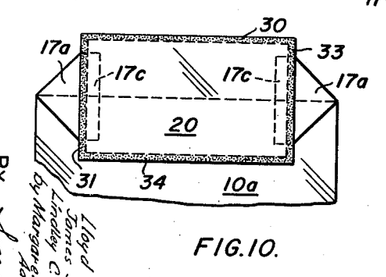
FIGURE 10 shows one end of the bag in its completed form.

The embodiment of the invention illustrated in FIGURES 8, 9 and 10 is substantially the same as that illustrated in FIGURES 1 to 7 inclusive, and similar numbers have therefore been applied to the corresponding parts. The only differences of note between the two embodiments are that (a) in the case of FIGURES 8–10 short parallel spaced apart cuts 35 are made in each end of the bag, the cuts being parallel to the axis 15 of the bag and being equidistantly spaced inwardly from the edges 11 and 12 thereof; and (b) in the case of FIGURES 8–10 the upper ends of the fold lines 17 meet the lower ends of cuts 35 instead of terminating in the edges 13 and 14 of the tube. The net results of the provision of these cuts 35 is that the triangular members 17a and 17b (which are pressed inwardly to form the open rectangles 18 and 19) are provided with rectangular extensions 17c at their bases; whilst the rectangular bottom member 20 is of somewhat greater area in order to take into account the increased size of the open rectangle, which increased size is attributable to the presence of the cuts 35.

The embodiment of the invention illustrated in FIGURES 11, 12, 13 14a and 14b will now be described. FIGURE 11 shows the blank from which the bag of this embodiment of the invention is constructed. This blank, which has been labelled 50, is a flattened tube of heat-sealable thermoplastic material having complementary sides 50a and 50b. Similar rectangular flaps 51 and 52 extend from the opposite ends of the sides 50a and 50b, respectively. The flaps 51 and 52 are narrower than the tube 50 when flattened, and a pair of similar cuts 53 is provided in each of the sides 50a and 50b, the cuts extending parallel to the axis 54 of the tube 50 and acting to increase the size of each of the rectangular flaps 51 and 52 since they are in effect continuations of the sides of the flaps 51 and 52. A rectangular cut-away portion 55 is provided in the side 50a of the tube 50 opposite the base of the rectangular flap 52, said cut-away portion being similar in size and shape to the area added to the rectangular flap 52 by the cuts 53. A similar cut-away portion 55a is provided in the opposite end of the wall 50b, in the area opposite the base of the rectangular flap 51. The cuts 53 are preferably of the same length as the distance which the flaps 51 and 52 extend beyond the remainder of the ends of the tube 50 so that blanks for succeeding bags can be cut from a continuous tube of material without any wastage of the material.

The folding and forming of the upper end of the blanks shown in FIGURE 11 so as to form a parallelepipedal bag end when the bag is filled will now be described. The lower end of the bag will not be dealt with since it will be understood that it could in similar manner be treated to form a bag end. A first fold line 56 is made which joins the extreme inner ends of the cuts 53 along a straight line which is transversely disposed to the axis 54 of the blank 50. Fold lines 57, extending at an angle of 45° to the axis 54 of the bag, are then made which extend from the innermost ends of the cuts 53 downwardly and outwardly to the edges 58 and 59 of the blank 50, and from the inner corners 60 of the cut-away portion 55 to the edges 58 and 59 of the tube. A third fold line 61 is then made in the side 50a of the tube, extending from the edge 59 to the edge 58 at the points where said edges are intersected by the lines 57.

Figures 12, 13, 14A:
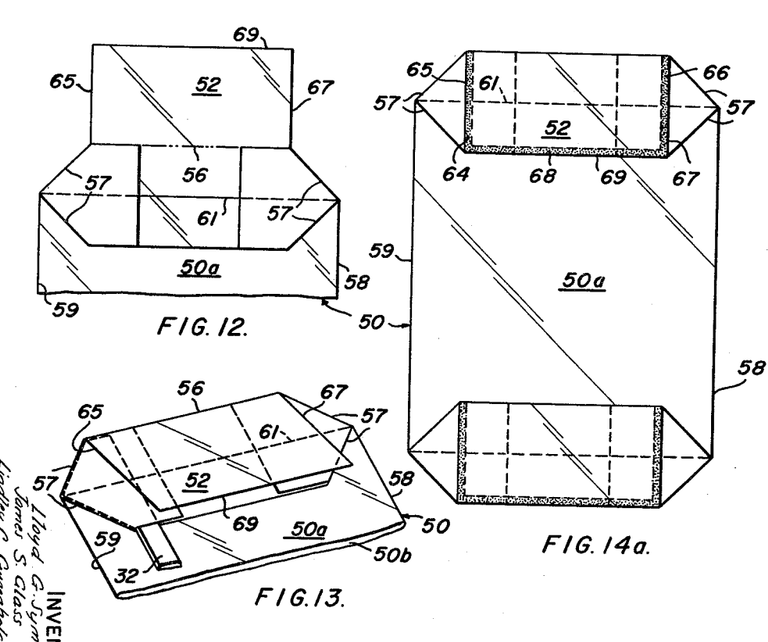
FIGURE 12 shows one end of the blank separated and folded so as to provide an open rectangle.
FIGURE 13 shows the open rectangle being covered by a rectangular flap formed integrally with the blank which constitutes the sidewalls of the bag, with said rectangular flap about to be heat-sealed so as to cover the open rectangle shown in FIGURE 12.
FIGURES 14a and 14b show this embodiment of the invention in its completed form, the bag in the case of FIGURE 14a being empty and in the case of FIGURE 14b being filled.
Figure 14B:
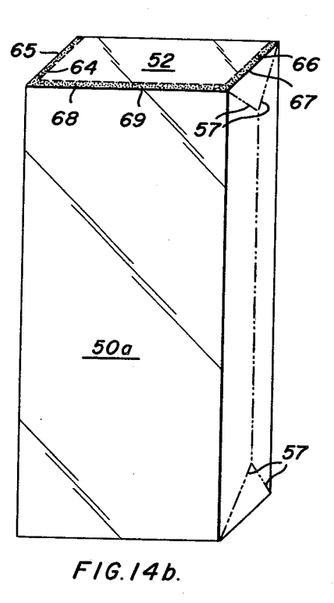

The sides 50a and 50b at the upper end of the tube 50 are then drawn apart from one another, the top corners of the tube above the lines 57 are pressed inwardly, and the part of side 50a bounded by the base of the cut-away portion 55, the third fold line 61, and two of the fold lines 57, is folded over along the third fold line 61 to assume the position shown in FIGURE 12, whereupon the rectangular flap 52 is folded along the said first fold line 56 so as to overlie the upper corners of the tube which have been pressed inwardly and downwardly as described above. An insulating element 32, such as the one described previously in connection with FIGURES 4 and 5 is then inserted under the folded over upper corners of the bag as indicated in FIGURE 13 and a first line of heat-sealing 64 is made between the edge 65 of the flap 52 and the base of the triangular folded over upper corner of the tube. A similar line of heat-sealing 66 is made between the opposite edge 67 of the rectangular flap 52 and the base of the opposite triangular folded over upper corner of the tube, once again making use of the insulating member 32 so as to prevent the heat-sealing effect spreading beyond the desired line of joinder. Once the heat-sealing lines 64 and 66 have been completed, a third line of heat-sealing 68 is made between the edge of the rectangular flap 52 opposite the fold line 56, which edge has been labelled 69, and the edge of the bag in the region of the base of the cut-away portion 55. The bag when completed but empty and collapsed appears as shown in FIGURE 14a. When the bag of this embodiment has been filled it would be of parallelepipedal shape as indicated in FIGURE 14b.

For some applications it is desirable to add a fourth line of heat-sealing, which would be located adjacent fold line 56, to stiffen the completed bag at the edge formed by this fold line.

Figure 15:
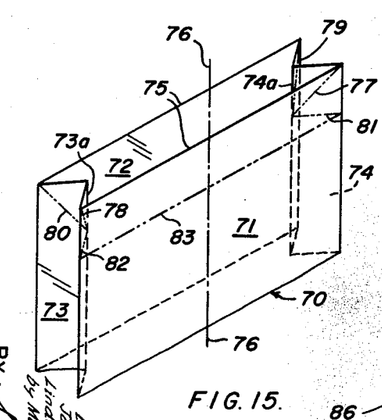
FIGURE 15 is a perspective view showing the tubular blank from which the particular embodiment of the invention is formed and showing the fold lines whereby one of the ends of the bag is folded to form an open rectangle preparatory to forming said end into a bottom.
Figure 16:
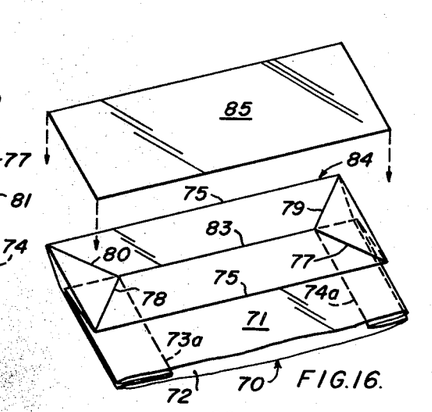
FIGURE 16 shows the application of a separate rectangular bottom member to one end of the bag after suitable separation and folding of that end along the fold lines shown in FIGURE 15.
Figure 17:
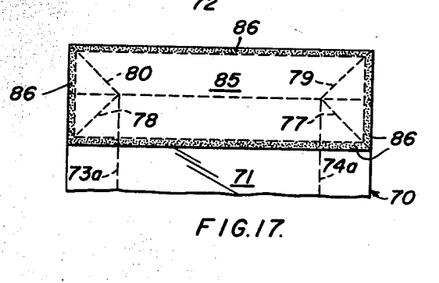
FIGURE 17 shows the completed end of the bag.

A further embodiment of the invention is shown in FIGURES 15, 16 and 17. This embodiment of the invention is generally similar to the embodiment shown in FIGURES 1 to 7 inclusive, except for the fact that the tubular blank from which the bag is formed is provided at two of its opposite sides with a similar gusset fold, whereby a bag of greater depth may be produced. In the embodiment of FIGURES 15–17, a tubular blank 70 of heat-sealable thermoplastic material, having similar rectangular front and back walls 71 and 72, respectively, is provided with similar side walls 73 and 74, each of which has a gusset fold (73a and 74a, respectively), and has top edges 75 extending at right angles to the longitudinal axis 76 of the tube 70. The forming of the base for the bag illustrated in FIGURES 15 to 17 is carried out in exactly the same way as the forming of the top and therefore, for the sake of brevity, only forming of the top will now be described.

In forming the top, fold lines 77 and 78 are made which extend downwardly and inwardly at an angle of 45° to the edge of the tube from the juncture points of the front wall of 71 with the side walls 73 and 74, respectively; the said fold lines terminating at the gusset folds 74a and 73a, respectively. Similar fold lines 79 and 80 extend downwardly and inwardly from the junctions of the back wall 72 with the side walls 74 and 73, respectively. The lines 79 and 80 terminate in the gusset folds 74a and 73a respectively, where they meet the lower ends of the lines 77 and 78. Additional fold lines 81 and 82 extend from the points where the lines 77 and 79 meet the gusset folds 74a and the point where the lines 78 and 80 meet the bellows fold 73a, the said lines 81 and 82 extending transversely across the front half of the sidewalls 74 and 73, respectively, to meet the front wall 71 of the tube at right angles to the edges thereof. An additional fold line 83 extends transversely across the front wall 71 to join the points at the edges of said wall where the lines 81 and 82 terminate.

Those familiar with the bag-making art will appreciate that when a tubular blank, having gusset folds in its side, has had one of its ends provided with fold lines as described above, these fold lines may be utilized to form the end of the bag into a rectangular formation as generally indicated at 84 in FIGURE 16. When such a formation has been achieved, a rectangular bottom member 85, formed separately from the tube 70 and being of substantially the same size as the rectangular formation 84, is aligned with the same as indicated in FIGURE 16, is superimposed upon it as indicated in FIGURE 17, and is then secured to the rectangular formation by lines of heat-sealing extending along each of the four edges of the rectangular member 85 and the periphery of the formation 84. In the case where a valve is to be provided in one of the corners of the bag, the lines of heat-sealing would be omitted along one of the narrow edges of the rectangular member 85. Reference numeral 86 is being used to indicate the several lines of heat-sealing in FIGURE 17.

Those skilled in the bag art will appreciate that a bag which is otherwise similar to the bag shown in FIGURES 11–14b could be constructed from a tube having a pair of gusset folds similar to those described above in connection with FIGURES 15, 16 and 17.

Figure 18:
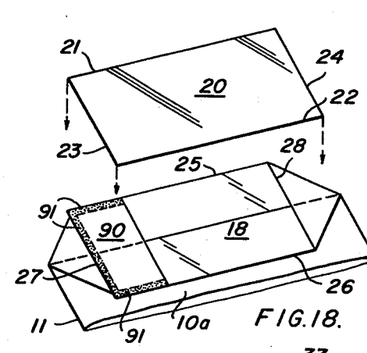
FIGURES 18 and 19 illustrate the forming of a filling valve in one corner of a bag constructed in accordance with the embodiment shown in FIGURES 1 to 7.
Figure 19:
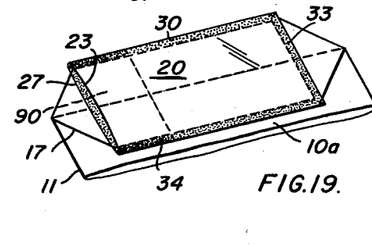

FIGURES 18 and 19 show the mounting of a filling valve in one corner of a bag of the type illustrated in FIGURES 1–7. The valve in this case is made by inserting, in the corner of the bag where edge 23 of the rectangular bottom member 20 is caused to normally overlie the edge 27 of the open rectangle 18, a rectangular valve flap 90 which is of the same width as the open rectangle 18 but is considerably shorter than said rectangle. One edge of this rectangular valve flap 90 is laid over the edge 27 of the open rectangle 18 and is heat-sealed along its three outer edges to the edge 27 and the adjacent parts of the edges 25 and 26 of the rectangle 18, as indicated at 91 in FIGURE 18. The rectangular bottom 20 is then secured to the edges of the open rectangle 18 as described in connection with FIGURES 1 to 7, except for the fact that the line of heat-sealing 31 employed in the embodiment of FIGURES 1 to 7 to secure together the edge 23 of the rectangular bottom and the edge 27 of the open rectangle 18 is omitted where a valve is being inserted as in FIGURES 18 and 19.

When a valve has been included in the bag as illustrated in FIGURES 18 and 19, the bag may be filled with granular or pulverulent material by inserting a conventional filling spout through an opening made by separating the outer end of the rectangular valve flap 90 from the part of the rectangular bottom 20 which lies thereabove. When the bag has been filled with the granular or pulverulent material the filling spout is withdrawn and the pressure of the material against the rectangular valve flap 90 will serve to force it into close contact with the inner face of the rectangular bottom 20, thus preventing leaking or spillage of the material in the bag.

Figures 20, 21, 22, 23, 24, 25:
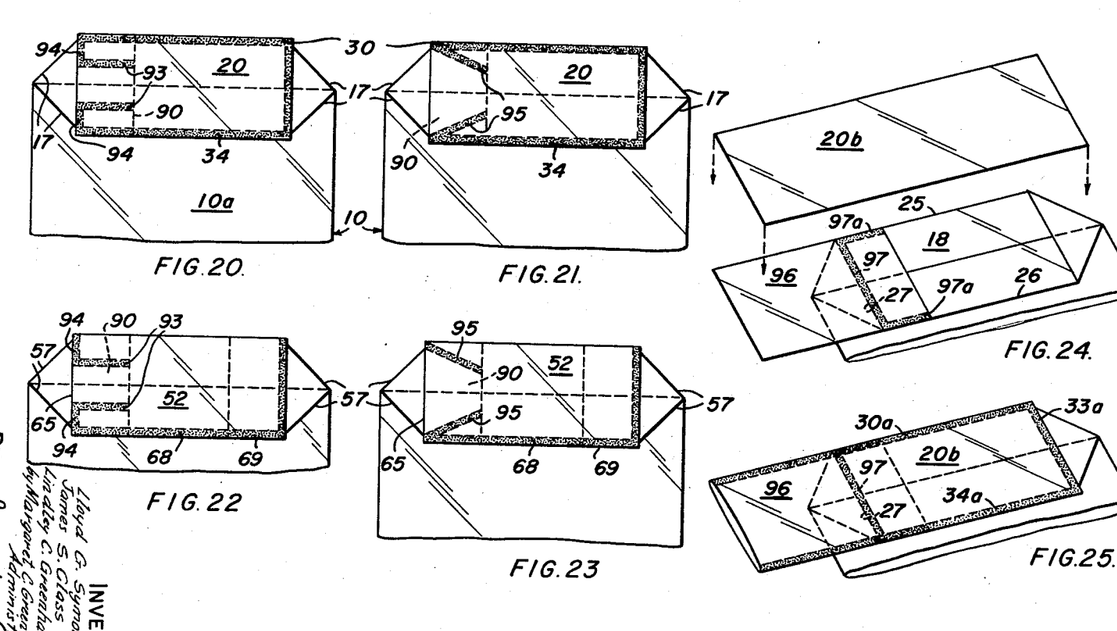
FIGURES 20 and 21 show two modifications of the valve illustrated in FIGURES 18 and 19 and associated with a bag of the type shown in FIGURES 1 to 7.
FIGURES 22 and 23 show valves generally similar to those shown in FIGURES 20 and 21, respectively, but mounted in a bag of the type shown in FIGURES 11–14b rather than FIGURES 1–7.
FIGURES 24 and 25 show yet another form of valve, the valve in this case being of the external sleeve type.

FIGURE 20 shows a valve which is generally similar to the one described in FIGURES 18 and 19 except for the fact that the width of the valve passageway is reduced by uniting the valve flap 90 to the underside of the rectangular bottom 20 by providing two additional lines of heat-sealing 93 which extend throughout the length of the flap 90, are parallel to the lines of heat-sealing 30 and 34, and are inwardly spaced therefrom. Preferably lines of heat-sealing 94 are also provided between the outer ends of the lines 93 and the adjacent ends of the lines of heat-sealing 30 and 34 (see FIGURE 20).

A further variation of the valve of FIGURES 18 and 19 is shown in FIGURE 21 where a valve passageway having an inwardly tapering form is created by joining the valve flap 90 to the under surface of the rectangular bottom 20 by means of two additional lines of heat-sealing 95 which extend inwardly for the full length of the rectangular valve 90 from the outer corners thereof, at a slight angle to the lines of heat-sealing 30 and 34 used to join the longitudinal edges of the rectangular bottom 20 to the longitudinal edges of the open rectangle 18 (as previously described in connection with FIGURES 1 to 7).

It can be appreciated without the aid of drawings that a rectangular valve flap like the one 90 illustrated in FIGURES 18 and 19 could with equal facility be formed in one corner of the bag of the type illustrated in FIGURES 11 to 14 inclusive, the only significant change being that in the latter case the integral rectangular flap 52 would play the role of the rectangular bottom 20.

FIGURES 22 and 23 show valve structures similar to those shown in FIGURES 20, 21 respectively, except for the fact that the valve, in the case of each of FIGURES 22 and 23, is inserted in one corner of a bag of the type described in connection with FIGURES 11 to 14 inclusive, rather than FIGURES 1 to 7 inclusive. It would appear in the circumstances unnecessary to describe the embodiment shown in FIGS. 22 and 23 in detail since the arrangements are substantially the same as those shown in FIGURES 20 and 21 with the exception of the fact that the rectangular integral flap 52 plays the role of the separate rectangular bottom 20.

FIGURES 24 and 25 show another type of valve mounted in one corner of the bag according to the invention. The bag construction in this case is similar to that illustrated in FIGURES 1 to 7 inclusive, with the exception that the line of heat-sealing 31 is omitted and, before the rectangular botom 20b is placed in position, a rectangular valve flap 96 of the same width as the open rectangle 18 but a shorter length than said rectangle is mounted in the corner of the bag so as to extend both inwardly and outwardly of the adjacent edge 27 of the rectangle 18. When mounted in this position, the rectangular valve 96 is secured to the adjacent edges of the rectangle 18 by means of a line of heat-sealing 97, which may be extended as indicated at 97a to join parts of the sides of the flap 96 to the edges 25 and 26 of rectangle 18. A rectangular bottom 20a is then superimposed upon the rectangle 18 and the valve flap 96. The rectangular bottom member 20b is similar to the rectangular bottom member 20 except for the fact that it is of extended length so that it will cover not only the open rectangle 18 but also the outward extension of the rectangular valve flap 96. When placed in position the rectangular bottom member 20b is joined to the edges of the rectangle 18 by means of lines of heat-sealing 30a, 33a and 34a (see FIGURE 25).

It will be noted that the portion of the rectangular bottom 20b which extends beyond the edge 27 of the open rectangle 18 cooperates with the valve flap 96 to form an outwardly extending tube through which the bag may be filled. The end of this outwardly extending tube, after filling, is closed off by heat-sealing, taping, gluing or in any other convenient way.

If a valve is desired which is narrower than the width of the bag, the valve flap 96 and the extended portion of the rectangular bottom 20b which overlies the valve flap 96, can each be suitably narrowed down.

Figures 26, 27:
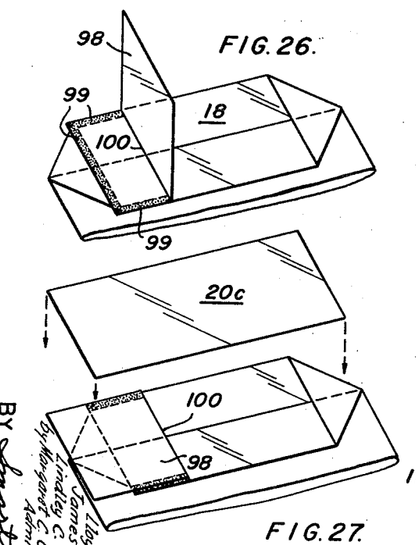
FIGURES 26, 27 and 28 show steps in the formation of yet another form of valve, the valve in this case being of the "tuck-in" type.
Figure 28:
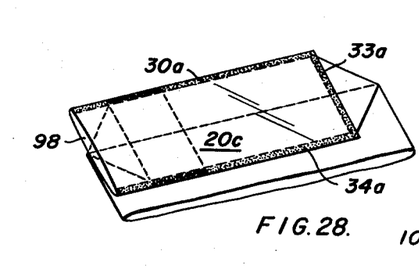

FIGURES 26, 27 and 28 show a valve similar to that shown in FIGURES 24 and 25 except for the fact that the inner portion of the valve flap 98 of FIGURES 26-28 is, after being joined to the adjacent edges of the open rectangle 18 as indicated at 99 in FIGURE 26, folded over upon itself through 180° along a fold line 100 so that the inner portion of the valve flap 98 will be of double thickness as shown in FIGURE 27. Once the valve flap has been arranged as shown in FIGURE 27 a rectangular bottom 20c is secured both to the open rectangle and to the valve flap as indicated in FIGURE 28, the joining of these members being similar to the joining of the members 20b and 96 in FIGURE 25. When a bag equipped with this valve has been filled, the valve may be sealed off by manually folding the end of the valve upon itself and tucking the folded over portion into the pocket previously formed by folding flap 98 along the line 100.

Figure 29:
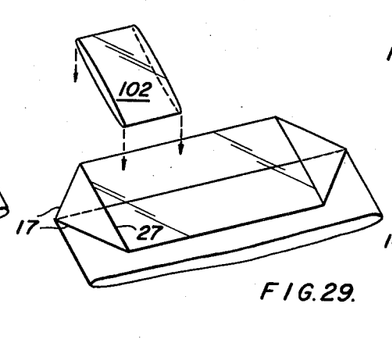
FIGURES 29, 30 and 31 show the forming of a still further valve embodiment employing a tubular valve sleeve of thermoplastic material.
Figure 30:
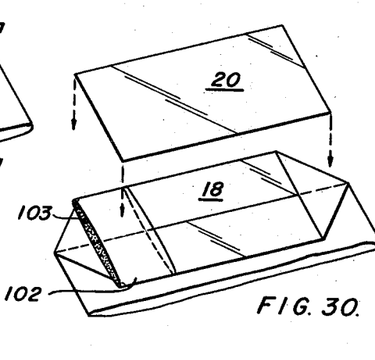
Figure 31:
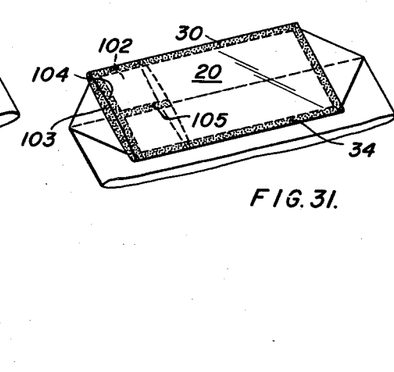

FIGURES 29, 30 and 31 show yet another type of valve applied to a bag according to the invention, the bag in this case being according to the embodiment illustrated in FIGURES 1 to 7 inclusive. In the case of FIGURES 29-31 the illustrated bag varies from the bag shown in FIGURES 1 to 7 in that the line of heat-sealing 31 in the top left-hand corner of the bag has been omitted and instead the edge 27 of the open rectangle 18 has been joined by heat-sealing to a flattened rectangular valve tube 102, whose lower outer lip is joined to said edge 27 by a line of heat-sealing 103 as indicated in FIGURES 30 and 31. The rectangular bottom member 20 is then heat-sealed to the edges of the open rectangle 18, just as in the case of FIGURES 1 to 7, except for the fact that in the case of FIGURES 29 to 31 the longitudinal heat-sealing lines 30 and 34 would not only contact the edges of the rectangular bottom 20 but may also contact the side edges of the flattened rectangular valve tube 102, as seen in FIGURE 31. The valve tube 102 may additionally be secured to the under surface of the rectangular bottom 20 by means of two lines of heat-sealing 104 and 105 extending respectively along the upper outer lip of the valve 102 and at right angles thereto, to intersect the mid-point thereof. For some applications it is desirable to make the valve tube 22 narrower than the width of the bag end.

While most of the valves which have been illustrated by way of example have been shown in connection with the bag embodiment illustrated in FIGURES 1 to 7, it will be appreciated that all of these valves could also be used with embodiment of the invention illustrated in FIGURES 8-10 inclusive, as well as the embodiment illustrated in FIGURES 11-14b, and the embodiment illustrated in FIGURES 15-17. In the case of the embodiments illustrated in FIGURES 11-14b, the integral rectangular flap 52 would play the role of the rectangular bottom 20 of FIGURES 1 to 7, and in case of the valves of FIGURES 24-28, the flap 52 would have to have an outward extension made from a separate piece of material, added to it in order to form the upper part of the outwardly extending sleeve.

While in the illustrated embodiments of the invention the bag has in each case been shown as being formed from a single ply of thermoplastic material, it will be appreciated that two or more plies could be employed without departing from the scope of the invention, and it will also be appreciated that instead of this single ply of thermoplastic material one could employ a sheet of thermoplastic material which has been laminated or reinforced with a substrate or paper, fabric or another thermoplastic sheet. Throughout the specification we have used the term "heat-sealing" and spoken of lines of "heat-sealing." We are desirous of having this terminology given a sufficiently broad interpretation, both in the specification and in the appended claims, to cover the cases where the lines of heat-sealing are made either by a conventional heat-sealing treatment, by high frequency heat-sealing, or by ultrasonic sealing.

What we claim as our invention is:

1. A bag which is foldable into a flat condition when empty and has a parallelepipedal shape when filled, said bag comprising, when empty, a flattened tube formed from heat-sealable thermoplastic material and having parallel ends which are at right angles to the axis of the tube, a first fold line extending transversely across one side of said tube near each end thereof, the first fold lines being parallel to one another and equidistantly spaced from their respective ends of the tube, a second set of fold lines in each side of the tube extending at an angle of 45 degrees to the axis of the tube from the two points of intersection of each of said first fold lines with the sides of said tube, and a rectangular bottom for each end of the tube, each bottom being formed from thermoplastic heat-sealable material and being non-integral with said tube, each of said bottoms being joined by at least three lines of heat-sealing, extending along three of its edges, to three of the edges of the rectangle formed by separating one of the ends of the tube and folding it (a) along the first fold line and (b) along the two fold lines at 45 degrees thereto, in which a generally rectangular inwardly extending valve flap, of the same width but shorter length than the rectangle formed by separating and folding one of the ends of the tube, is interposed between said rectangle and the rectangular bottom joined to said rectangle, is aligned with said rectangle at one corner thereof and is joined to said corner of said rectangle by three lines of heat-sealing extending along the three outer edges of its periphery, and in which the said valve flap is joined to said rectangular bottom by lines of heat-sealing extending along two of the three outer edges of its periphery but not along the third one, and in which said valve flap is additionally joined to said rectangular bottom by two parallel lines of heat-sealing extending parallel to but inwardly spaced from the said two lines of heat-sealing joining edges of the rectangular valve flap to the rectangular bottom.

2. A bag which is foldable into a flat condition when empty and has a parallelepipedal shape when filled, said bag comprising, when empty, a flattened tube formed from heat-sealable thermoplastic material and having parallel ends which are at right angles to the axis of the tube, a first fold line extending transversely across one side of said tube near each end thereof, the first fold lines being parallel to one another and equidistantly spaced from their respective ends of the tube, a second set of fold lines in each side of the tube extending at an angle of 45 degrees to the axis of the tube from the two points of intersection of each of said first fold lines with the sides of said tube, and a rectangular bottom for each end of the tube, each bottom being formed from thermoplastic heat-sealable material and being non-integral with said tube, each of said bottoms being joined by at least three lines of heat-sealing, extending along three of its edges, to three of the edges of the rectangle formed by separating one of the ends of the tube and folding it (a) along the first fold line and (b) along the two fold lines at 45 degrees thereto, in which a generally rectangular inwardly extending valve flap, of the same width but shorter length than the rectangle formed by separating and folding one of the ends of the tube, is interposed between said rectangle and the rectangular bottom joined to said rectangle, is aligned with said rectangle at one corner thereof and is joined to said corner of said rectangle by three lines of heat-sealing extending along the three outer edges of its periphery, and in which the said valve flap is joined to said rectangular bottom by lines of heat-sealing extending along two of the three outer edges of its periphery but not along the third one, and in which said valve flap is additionally joined to said rectangular bottom by two lines of heat-sealing extending inwardly from the third outer edge of said valve flap at an angle to the said two lines of heat-sealing joining edges of the rectangular valve flap to the rectangular bottom.

3. A bag which is foldable into a flat condition when empty and has a parallelepipedal shape when filled, said bag comprising, when empty, a flattened tube formed from heat-sealable thermoplastic material and having a rectangular flap formed integrally with and extending from each end thereof on opposite sides of the flattened tube, said flaps being narrower than the width of the tube when flattened, a first fold line at the base of each of said rectangular flaps, and a second set of fold lines extending, in each side of the flattened tube, at an angle of 45 degrees to the axis of the tube, from the opposite ends of each of the first fold lines to intersect the edges of the flattened tube, a third fold line adjacent each end of the tube in the side thereof opposite the side from which the rectangular flap extends, each of the third fold lines extending transversely across the flattened tube to join the points of intersection of said second set of fold lines with the edges of said tube when flattened, each of said flaps being joined along at least two of its free edges by a line of heat-sealing to an edge of the rectangle formed by separating one of the ends of the tube and folding it (a) along the third fold line, (b) along the second set of fold lines and (c) along the first fold line, and in which bag a rectangular inwardly extending valve flap is mounted in one corner of the bag between said integral rectangular bottom flap and the rectangle formed by separating and opening the end of the bag, said valve flap facilitating the filling of the bag with material and the retention of said materials in the bag when filled therewith.

4. A bag which is foldable into a flat condition when empty and has a parallelepipedal shape when filled, said bag comprising, when empty, a flattened tube formed from heat-sealable thremoplastic material and having a rectangular flap formed integrally with and extending from each end thereof on opposite sides of the flattened tube, said flaps being narrower than the width of the tube when flattened, a first fold line at the base of each of said rectangular flaps, and a second set of fold lines extending, in each side of the flattened tube, at an angle of 45 degrees to the axis of the tube, from the opposite ends of each of the first fold lines to intersect the edges of the flattened tube, a third fold line adjacent each end of the tube in the side thereof opposite the side from which the rectangular flap extends, each of the third fold lines extending transversely across the flattened tube to join the points of intersection of said second set of fold lines with the edges of said tube when flattened, each of said flaps being joined along at least two of its free edges by a line of heat-sealing to an edge of the rectangle formed by separating one of the ends of the tube and folding it (a) along the third fold line, (b) along the second set of fold lines and (c) along the first fold line, and in which bag a generally rectangular inwardly extending valve flap, of the same width but shorter length than the rectangle formed by separating and folding one of the ends of the tube, is interposed between said rectangle and the integral rectangular bottom flap at said end of the tube, is aligned with said rectangle at one corner thereof and is joined to said corner of said rectangle by three lines of heat-sealing extending along the three outer edges of its periphery, and in which the said valve flap is joined to said bottom flap by a line of heat-sealing extending along the side of said bottom flap opposite to the side which is integrally joined to said tube.

5. A bag which is foldable into a flat condition when empty and has a parallelepipedal shape when filled, said bag comprising, when empty, a flattened tube formed from heat-sealable thermoplastic material and having a rectangular flap formed integrally with and extending from each end thereof on opposite sides of the flattened tube, said flaps being narrower than the width of the tube when flattened, a first fold line at the base of each of said rectangular flaps, and a second set of fold lines extending, in each side of the flattened tube, at an angle of 45 degrees to the axis of the tube, from the opposite ends of each of the first fold lines to intersect the edges of the flattened tube, a third fold line adjacent each end of the tube in the side thereof opposite the side from which the rectangular flap extends, each of the third fold lines extending transversely across the flattened tube to join the points of intersection of said second set of fold lines with the edges of said tube when flattened, each of said flaps being joined along at least two of its free edges by a line of heat-sealing to an edge of the rectangle formed by separating one of the ends of the tube and folding it (a) along the third fold line, (b) along the second set of fold lines and (c) along the first fold line, and in which bag a generally rectangular inwardly extending valve flap, of the same width but shorter length than the rectangle formed by separating and folding one of the ends of the tube, is interposed between said rectangle and the integral rectangular bottom flap at said end of the tube, is aligned with said rectangle at one corner thereof and is joined to said corner of said rectangle by three lines of heat-sealing extending along the three outer edges of the periphery, and in which the said valve flap is joined to said bottom flap by a line of heat-sealing extending along the side of said bottom flap opposite to the side which is integrally joined to said tube, and in which said valve flap is additionally joined to said integral rectangular bottom flap by two parallel lines of heat-sealing extending parallel to the aforesaid line of heat-sealing joining the valve flap to the bottom flap, said parallel lines forming a valved filling passage which is narrower than the width of the rectangular bottom flap.

6. A bag which is foldable into a flat condition when empty and has a parallelepipedal shape when filled, said bag comprising, when empty, a flattened tube formed from heat-sealable thermoplastic material and having a rectangular flap formed integrally with and extending from each end thereof on opposite sides of the flattened tube, said flaps being narrower than the width of the tube when flattened, a first fold line at the base of each of said rectangular flaps, and a second set of fold lines extending, in each side of the flattened tube, at an angle of 45 degrees to the axis of the tube, from the opposite ends of each of the first fold lines to intersect the edges of the flattened tube, a third fold line adjacent each end of the tube in the side thereof opposite the side from which the rectangular flap extends, each of the third fold lines extending transversely across the flattened tube to join the points of intersection of said second set of fold lines with the edges of said tube when flattened, each of said flaps being joined along at least two of its free edges by a line of heat-sealing to an edge of the rectangle formed by separating one of the ends of the tube and folding it (a) along the third line, (b) along the second set of fold lines and (c) along the first fold line, and in which bag a generally rectangular inwardly extending valve flap, of the same width but shorter length than the rectangle formed by separating and folding one of the ends of the tube, is interposed between said rectangle and the integral rectangular bottom flap at said end of the tube, is aligned with said rectangle at one corner thereof and is joined to said corner of said rectangle by three lines of heat-sealing extending along the three outer edges of its periphery, and in which the said valve flap is joined to said bottom flap by a line of heat-sealing extending along the side of said bottom flap opposite to the side where it is integrally joined to said tube, and in which said valve flap is additionally joined to said integral rectangular bottom flap by a pair of lines of heat-sealing extending inwardly from the outer corners of the valve flap at a small angle to the adjacent sides of the valve flap, to form an inwardly tapering valved filling passage.

7. A bag which is foldable into a flat condition when empty and has a parallelepipedal shape when filled, said bag comprising, when empty, a flattened tube formed from heat-sealable thermoplastic material and having a rectangular flap formed integrally with and extending from each end thereof on opposite sides of the flattened tube, said flaps being narrower than the width of the tube when flattened, a first fold line at the base of each of said rectangular flaps, and a second set of fold lines extending, in each side of the flattened tube, at an angle of 45 degrees to the axis of the tube, from the opposite ends of each of the first fold lines to intersect the edges of the flattened tube, a third fold line adjacent each end of the tube in the side thereof opposite the side from which the rectangular flap extends, each of the third fold lines extending transversely across the flattened tube to join the points of intersection of said second set of fold lines with the edges of said tube when flattened, each of said flaps being joined along at least two of its free edges by a line of heat-sealing to an edge of the rectangle formed by separating one of the ends of the tube and folding it (a) along the third fold line, (b) along the second set of fold lines and (c) along the first fold line, and in which bag a valve in the form of a flattened tube is mounted in one corner of the bag between the integral rectangular flap and the rectangle formed by separating and opening the end of the bag, said valve facilitating the filling of the bag with material and the retention of said material in the bag when filled therewith.

References Cited by the Examiner

UNITED STATES PATENTS

| | | | |
|---|---|---|---|
| 325,922 | 9/85 | Feister | 229—61 |
| 401,687 | 4/89 | Claussen | 229—57 X |
| 1,995,286 | 3/35 | Arzet | 229—58 |
| 2,177,122 | 10/39 | Tooker | 229—62.5 |
| 2,275,505 | 3/42 | Crawford | 229—62.5 |
| 2,353,605 | 7/44 | Waters | 229—58 |
| 2,381,850 | 8/45 | Williams | 93—35 |
| 2,722,165 | 11/55 | Yount | 229—58 |
| 2,771,010 | 11/56 | Piazze | 93—35 |
| 3,000,551 | 9/61 | Atwood | 229—62.5 |

FOREIGN PATENTS

| | | |
|---|---|---|
| 30,641 | 3/60 | Finland. |
| 94,813 | 3/54 | Norway. |

GEORGE O. RALSTON, *Primary Examiner.*